United States Patent [19]
Kuo et al.

[11] Patent Number: 5,854,308
[45] Date of Patent: Dec. 29, 1998

[54] WATER-BASED PIGMENTED INKS HAVING SILICONE-CONTAINING POLYMER INCORPORATED THEREIN

[75] Inventors: Richard J. Kuo, St. Paul; Smarajit Mitra, West St. Paul; Charles E. Boyer, III, Lakeland Township; Daniel B. Pendergrass, Jr., Mendota Heights, all of Minn.

[73] Assignee: Minnesota Mining And Manufacturing Company, St. Paul, Minn.

[21] Appl. No.: 608,921

[22] Filed: Feb. 29, 1996

[51] Int. Cl.$^6$ .................................................. C09D 11/10
[52] U.S. Cl. ..................... 523/161; 524/261; 524/265; 524/267; 524/502; 524/504; 524/505; 524/506; 260/DIG. 38; 106/31.13
[58] Field of Search ............................ 523/161; 524/261, 524/165, 267, 502, 504, 506, 505; 106/20 R; 265/DIG. 38

[56] References Cited

U.S. PATENT DOCUMENTS

| | | | |
|---|---|---|---|
| 4,597,794 | 7/1986 | Ohta et al. ................................. | 106/20 |
| 4,959,661 | 9/1990 | Buxton et al. ........................... | 346/1.1 |
| 4,972,037 | 11/1990 | Garbe et al. ............................. | 526/245 |
| 4,981,902 | 1/1991 | Mitra et al. .............................. | 524/547 |
| 4,981,903 | 1/1991 | Garbe et al. ............................. | 524/547 |
| 5,085,698 | 2/1992 | Ma et al. .................................. | 106/20 |
| 5,125,968 | 6/1992 | Takimoto et al. ........................ | 106/20 |
| 5,418,016 | 5/1995 | Cornforth et al. ...................... | 427/515 |
| 5,468,477 | 11/1995 | Kumar et al. .......................... | 424/78.17 |

FOREIGN PATENT DOCUMENTS

| | | |
|---|---|---|
| 0 588 534 | 3/1994 | European Pat. Off. . |
| 0 618 509 | 10/1994 | European Pat. Off. . |
| WO 95/02880 | 1/1995 | WIPO .............................. G11B 7/00 |
| WO 95/03776 | 2/1995 | WIPO .............................. A61K 7/06 |

OTHER PUBLICATIONS

Derwent Abstract for JP 7-041-712 (1995).
Derwent Abstract for JP 6-256-661 (1994).

*Primary Examiner*—Marion E. McCamish
*Assistant Examiner*—John J. Guarriello
*Attorney, Agent, or Firm*—Gary L. Griswold; John H. Hornickel

[57] ABSTRACT

Water-based pigmented ink formulations are disclosed including a water soluble or water dispersible silicone-containing polymer additive comprising a vinyl silicone polymer. The additive significantly reduces kogation, mudcracking, and banding in some or all of the pigmented ink formulations.

14 Claims, No Drawings

WATER-BASED PIGMENTED INKS HAVING SILICONE-CONTAINING POLYMER INCORPORATED THEREIN

FIELD OF THE INVENTION

This invention relates to inks having silicone-containing polymers as additives therein.

BACKGROUND OF THE INVENTION

Pigmented inks for ink jet applications have to meet several stringent requirements. For example, particle size has to be very small and particle size distribution has to be narrow in order to avoid pigment settling and nozzle plugging. The dispersion has to have good stability against agglomeration in order to avoid nozzle plugging and to have good shelf life. The ink has to have good thermal stability, particularly for application in thermal ink jet printers, in order to avoid "kogation". The ink has to have good film forming property in order to have good smear resistance and to avoid "mudcracking" problems. The viscosity of the ink has to be in the right range (typically between 1.2 and 10 centipoise and preferably between 1.2 and 5 centipoise) in order to have correct jetting properties such as ink drop velocity, drop mass, and refill time. Other properties such as surface tension, drying rate, anti-biological growth, color gamut and color density are also very important.

Among the above mentioned requirements, dispersion stability, anti-kogation, and anti-mudcracking are the toughest challenges for ink formulators.

Pigment dispersions are thermodynamically unstable. The suspended pigment particles tend to agglomerate due to attractive van der Waals forces. Since ink jet printers make use of very small jet nozzles (on the order of less than about 80 micrometers) to provide high resolution images, the resulting pigment agglomeration has a tendency to plug the printer heads. Additionally, in the case of thermal ink jet systems, such inks also suffer from the tendency of materials to settle onto, and coat, the heating elements of the printer heads. This causes a reduced thermal efficiency of the print head which results in the formation of smaller ink droplets and lower image quality. This effect is commonly referred to as "kogation".

To overcome the problems described above, dispersants are typically employed to adsorb onto pigment surface to build a protective layer, (either electrostatically or stericly or a combination of both,) around each particle to counteract the attractive forces.

In one approach, as disclosed in U.S. Pat. Nos. 5,125,968 and 4,959,661, the dispersants are selected from surfactants which contain a hydrophilic portion as well as a hydrophobic portion.

In another approach, polymers having hydrophilic segments and hydrophobic segments have been used. Polymer dispersants having both random and block structures have been disclosed. Examples of these approaches are described in U.S. Pat. No. 4,597,794 and 5,085,698.

Other attempts involving the use of polymeric dispersants have been made as well. For example, water-soluble polymers such as styrene-acrylic acid copolymers, sulfonated polyesters, and particulate polymer dispersions have also been considered, yet these have yielded only partial success. In particular, such systems, although promising, have tended to produce non-uniform printed solid block images. The lack of uniformity in the printed image, which becomes more pronounced with prolonged printing, is caused by incomplete coverage of the receptor surface in the image area.

This problem, commonly referred to as "banding" results from progressively smaller projected ink drops over the course of a printing job. This effect is believed to be a result of kogation, caused by deposition of thermal insulating materials on the heating elements within the printing cartridge. As a result, heat transfer efficiency into the ink is decreased, thereby reducing the ability to produce properly sized ink bubbles needed for the printing process. Even if the deposited material is thermally conductive, it may still change the nucleation behavior on the heater surface during heating which also may adversely affect the bubble formation.

The problems associated with kogation and banding can be reduced or perhaps eliminated by proper selection of surfactants as dispersants. However, since surfactants typically have low molecular weights and therefore are not film formers, mudcracking often occurs in the printed image especially in the secondary color and 4-color black areas.

SUMMARY OF THE INVENTION

One aspect of this invention relates to water-based pigmented inks that can meet the stringent requirements of ink jet printing applications, particularly thermal ink jet and other printing applications.

Another aspect of the present invention relates to water-based pigmented inks in which a water soluble or water dispersible silicone-containing polymer is incorporated as an additive in order to improve the quality of printed image by minimizing the likelihood of banding and mudcracking problems. "Water-based" refers to either water or water and water miscible organic solvents. Nonlimiting examples of such organic solvents include alcohols. The inks of the present invention are contemplated for use in a variety of water-based carrier liquids.

A water-based pigmented ink formulation can comprise a water soluble or water dispersible vinyl silicone polymer.

Another aspect of the present invention relates to ink formulations, comprising a vinyl silicone graft or block copolymer with a silicone polymer segment and a vinyl polymer segment. This block or graft copolymer is prepared by the free radical polymerization of a mercapto functional silicone chain transfer agent and vinyl monomers.

Another aspect of the present invention relates to ink formulations, comprising a copolymer which has pendant polysiloxane grafts on a backbone formed by the polymerization of ethylenically unsaturated monomers.

A wide variety of pigments can be used in the present invention, including without limitation, various organic pigments and various inorganic pigments.

A feature of the invention is that the inks have general utility in printing, particularly in ink jet printing applications.

The selection of water soluble silicone polymer as an additive is based on several considerations. There is some reason to believe that silicone-based polymers are less likely to cause kogation problem because the adhesion of these materials to the heater elements is probably relatively weak compared to other polymeric materials.

Secondly, silicone-based polymers are usually more thermally stable so that decomposition is less likely to occur when the heater elements are intensely heated during the jetting process. Thermal decomposition of polymeric materials can produce water insoluble fragments which may have a propensity to deposit onto the heater elements.

Thirdly, the polymer additive has a solution viscosity significantly lower than that of other polymers of equivalent molecular weight. This is also an important consideration because in order to achieve correct jetting properties such as ink drop velocity, drop mass, and refill rate, the ink has to maintain in the low viscosity range as mentioned previously.

Another potential advantage of using the polymer of the present invention is that this polymer will leave a film on substrate with silicone-like surface characteristics which may help to reduce water sensitivity of the printed images.

Further features and advantages will become apparent as embodiments of the invention are described.

EMBODIMENTS OF THE INVENTION

Ink Formulations

Inks of the present invention comprise pigment, dispersant, surfactant, water-based liquid carrier, silicone-containing polymeric additive, and a polyhydric alcohol such as diethylene glycol.

The amount of pigment in the ink formulation ranges from about 0.1 to about 15 percent, and preferably from about 0.5 to about 8 percent by weight of the total ink composition.

The amount of dispersant in the ink formulation ranges from about 0.1 to about 20 percent, and preferably from about 0.2 to about8 percent by weight of the total ink composition.

The amount of surfactant in the ink formulation ranges from about 0.01 to about 6 percent, and preferably from about 0.1 to about4 percent by weight of the total ink composition.

The amount of either water or water and water miscible organic solvent in the ink formulation ranges from about 20 to about 90 percent, and preferably from about 30 to about 80 percent by weight of the total ink composition.

The amount of silicone-containing polymer in the ink formulation ranges from about 0.01 to about 8 percent, and preferably from about 0.02 to about 4 percent by weight of the total ink composition.

The amount of polyhydric alcohol in the ink formulation ranges from about 5 to about 70 percent, and preferably from about 10 to about 50 percent by weight of the total ink composition.

Other additives can optionally be added to the ink composition, such as biocides, chelating agents, pH modifiers, humectants, viscosity modifiers, and the like, according to practices known to those skilled in the art.

Pigment

As stated above, ink formulations can employ any of the various organic pigments and any of the various inorganic pigments.

Nonlimiting examples of black pigments include carbon black such as Special Black 4, Special Black 5, Special 6, Special Black 4A, Color Black FW 200, and Color Black FW2 pigments (all manufactured by Degussa Corporation of Ridgefield, N.J.); Raven 1200 carbon black, Raven 1170 carbon black, Raven 3500 carbon black, and Raven 5750 carbon black pigments (all available from Columbian Chemical Corp. of Atlanta, Ga.); Mogol L carbon black and Sterling NS carbon black pigments (both available from Cabot Corp. of Boston, Mass.); and Carbon Black MA-100 pigment (available from Mitsubishi Kasei Corp. of Tokyo, Japan).

Nonlimiting examples of magenta pigments include Quindo Magenta RV-6828 Pigment Red 122, Quindo Magenta RV-6831 Pigment Red 122 presscake, Quindo Red R-6713 PV 19, and Quindo Magenta RV-6843 Pigment Red 202 pigments (all available from Bayer Corp. of Rock Hill, S.C.); and Sunfast Magenta 122 and Sunfast Magenta 202 pigments (both available from Sun Chemical Corp. of Cincinnati, Ohio).

Nonlimiting examples of cyan pigments include Palomar Blue B-4810 PB 15:3, Palomar Blue B-4710 PB 15:1, and Palomar Blue B-4900 pigments (all available from Bayer Corp.); and Sunfast Blue 15:3 pigment presscake (available from Sun Chemical);

Nonlimiting examples of yellow pigments include Fanchon Fast Y-5700 PY 139 and Fanchon Fast Yellow Y-5688 C.I. Pigment Yellow 150 pigments (available from Bayer Corp.); Sunbrite Yellow 14 presscake and Spectra Pac Yellow 83 pigments (both available from Sun Chemical); and Irgazin Yellow 2RLT PY 110, Irgazin Yellow 2GLTN PY 109, Irgazin Yellow 2GLTE PY 109, and Irgazin Yellow 3RLTN PY 110 pigments (all available from Ciba Geigy of Newport, Del.).

Dispersant

Ink formulations of the present invention can employ ionic and nonionic dispersants. Nonlimiting examples include Pluronic L62LF, Pluronic L31, Pluronic L92, and Pluronic F68 dispersants (all available from BASF Corp. of Parsippany, N.J.); Antarox P-84 and Antarox P-1 04 dispersants (both available from Rhone-Poulenc of Cranbury, N.J.); Poly-Tergent P-9E, Poly-Tergent-P-17D and Poly-Tergent 2A1 dispersants (all available from Olin Chemicals of Stamford, Conn.); Amphoterge KJ-2 and Amphoterge J-2 dispersants (both available from Lonza of Fairlawn, N.J.); Sokalan PA 30CL dispersant (available from BASF Corp.); Solsperse 27000 dispersant (available from Zeneca Colors of Wilmington, Del.); Carbowax Polyethylene Glycol 400, Carbowax Polyethylene Glycol 600, Carbowax Polyethylene Glycol 1000, Carbowax Polyethylene Glycol 1450, and Carbowax Polyethylene Glycol 3350 dispersants (all available from Union Carbide Corp. of Danbury, Conn.); and Acusol 445N, Acusol 450, and Acusol 480N dispersants (all available from Rohm and Haas of Philadelphia, Pa.).

Also useful as a dispersant is a reaction product of vinylazlactone and Bayer's aspartic ester, ring opened with amines followed by hydrolysis with a sodium hydroxide solution, such as disclosed in copending, coassigned U.S. patent application Ser. Nos. 08/556,336 and 08/558,003, the disclosures of which are incorporated by reference herein.

Surfactant

Ink formulations of the present invention can employ ionic and nonionic surfactants.

Nonlimiting examples of anionic surfactants include Aerosol OT surfactant (available from American Cyanamid of West Paterson, N.J.); and Darvan No. 1 and Darvan No. 7 surfactants (both available from R. T. Vanderbilt Co. of Norwalk, Conn.).

Nonlimiting examples of nonionic surfactants include Triton X-100, Triton X-102, Triton X-114, Triton N-101, and Triton CF-10 surfactants (all available from Union Carbide Corp.); Surfynol CT-136, Surfynol 104, Surfynol 465, and Surfynol TG surfactants (all available from Air Products and Chemicals of Allentown, Pa.) and Tergitol NP-8, Tergitol NP-9, and Tergitol NP-10 surfactants (all available from Union Carbide Chemicals and Plastics Co. of Danbury, Conn.).

Polymeric Additive

The polymeric additive useful in the present invention is a vinyl silicone graft or block copolymer.

Nonlimiting examples of silicone-containing copolymers useful in the present invention, and their methods of preparation, are vinyl silicone graft or block copolymers disclosed in U.S. Pat. No. 5,468,477 (Kumar et al.) and PCT Patent Publication WO 95/03776, the disclosures of which are incorporated by reference herein.

Other examples of silicone-containing copolymer useful for the present invention are copolymers having pendant polysiloxane grafts on a backbone formed by the polymerization of ethylenically unsaturated monomers. The copolymer comprises repeating A, B, and C monomers which are disclosed in U.S. Pat. No. 4,981,902 (Mitra et al.) and U.S. Pat. No. 4,981,903 (Garbe et al.), the disclosures of which are incorporated by reference herein. The copolymers can optionally contain fluoromonomers such as disclosed in U.S. Pat. No. 4,972,037 (Garbe et al.), the disclosure of which is incorporated by reference herein.

Desirably, the copolymer used in the formulations of the present invention is either a graft or block copolymer and is represented by the following general formula.

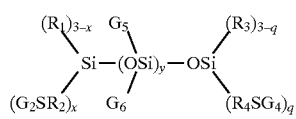

wherein $G_5$ represent monovalent moieties which can independently be the same or different selected from the group consisting of alkyl, aryl, alkaryl, alkoxy, alkylamino, fluoroalkyl, hydrogen, and -ZSA; A represents a vinyl polymeric segment consisting essentially of polymerized free radically polymerizable monomer, and Z is a divalent linking group. Useful divalent linking groups Z include but are not limited to the following: $C_1$ to $C_{10}$ alkylene, alkarylene, arylene, and alkoxyalkylene. Preferably, Z is selected from the group consisting of methylene and propylene for reasons of commercial availability.

$G_6$ represents monovalent moieties which can independently be the same or different selected from the group consisting of alkyl, aryl, alkaryl, alkoxy, alkylamino, fluoroalkyl, hydrogen, and -ZSA;

$G_2$ comprises A;

$G_4$ comprises A;

$R_1$ represents monovalent moieties which can independently be the same or different and are selected from the group consisting of alkyl, aryl, alkaryl, alkoxy, alkylamino, fluoroalkyl, hydrogen, and hydroxyl; Preferably, $R_1$ represents monovalent moieties which can independently be the same or different selected from the group consisting of $C_{1-4}$ alkyl and hydroxyl for reasons of commercial availability. Most preferably, $R_1$ is methyl.

$R_2$ can independently be the same or different and represents divalent linking groups. Suitable divalent linking groups include but are not limited to the following: $C_1$ to $C_{10}$ alkylene, arylene, alkarylene, and alkoxyalkylene. Preferably, $R_2$ is selected from the group consisting of $C_{1-3}$ alkylene and $C_7-C_{10}$ alkarylene due to ease of synthesis of the compound. Most preferably, $R_2$ is selected from the group consisting of —$CH_2$—, 1,3-propylene, and

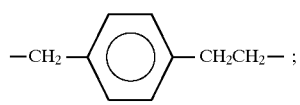

$R_3$ represents monovalent moieties which can independently be the same or different and are selected from the group consisting of alkyl, aryl, alkaryl, alkoxy, alkylamino, fluoroalkyl, hydrogen, and hydroxyl; Preferably, $R_3$ represents monovalent moieties which can independently be the same or different selected from the group consisting of $C_{1-4}$ alkyl and hydroxyl for reasons of commercial availability. Most preferably, $R_3$ is methyl.

$R_4$ can independently be the same or different and are divalent linking groups. Suitable divalent linking groups include but are not limited to the following: $C_1$ to $C_{10}$ alkylene, arylene, alkarylene and alkoxyalkylene. Preferably, $R_4$ is selected from the group consisting of $C_{1-3}$ alkylene and $C_7-C_{10}$ alkarylene for reasons of ease of synthesis. Most preferably, $R_4$ is selected from the group consisting of —$CH_2$—, 1,3-propylene, and

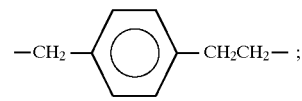

x is an integer of 0–3;

y is an integer of 5 or greater; preferably, y is an integer ranging from about 10 to about 270 in order to provide the silicone segment with a molecular weight ranging from about 750 to about 20,000. Most preferably, y is an integer ranging from about 40 to about 270;

q is an integer of 0–3;

wherein at least one of the following is true:

q is an integer of at least 1;

x is an integer of at least 1;

$G_5$ comprises at least one -ZSA moiety;

$G_6$ comprises at least one -ZSA moiety.

As noted above, A is a vinyl polymeric segment formed from polymerized free radically polymerizable monomers. The selection of A is typically based upon the intended uses of the composition, and the properties the copolymer must possess in order to accomplish its intended purpose. If A comprises a block in the case of block copolymers, a polymer having AB and ABA architecture will be obtained depending upon whether a mercapto functional group —SH is attached to one or both terminal silicon atoms of the mercapto functional silicone compounds, respectively. The weight ratio of vinyl polymer block or segment, to silicone segment of the copolymer can vary. The preferred copolymers are those wherein the weight ratio of vinyl polymer segment to silicone segment ranges from about 98:2 to 40:60, in order that the copolymer possesses properties inherent to each of the different polymeric segment while retaining the overall polymer's solubility in low-viscosity silicone oil and/or low-boiling-point oil.

Poly(dimethylsiloxane)-g-poly(acrylate) polymers are preferred for use in this invention. These polymers are formed by grafting a poly(dimethylsiloxane) polymer with a poly(acrylate) polymer. The resulting polymer has the following chemical structure:

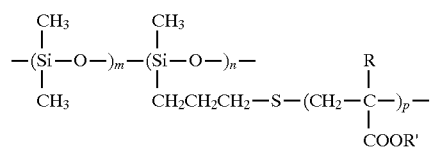

where R and R' are independently selected from the group consisting of hydrogen and alkyl groups having from about 1 to about 18 carbon atoms; where m/n ranges from 9 to 49; and where p is a number ranging from about 1 to about 10,000.

The poly(dimethylsiloxane) polymer can have a Molecular Weight (number average) ranging from about 750 to about 20,000, preferably from about 3,000 to about 20,000.

The poly(acrylate) polymer can be any polymer formed from acrylic monomer(s) having from about 4 to about 25 carbon atoms, and preferably from about 4 to about 15 carbon atoms. Representative examples of monomers that may be used to form the vinyl polymeric segment represented herein by A (hereafter "A monomers") are the lower to intermediate acrylic acid esters, or methacrylic acid esters of alkyl alcohols. Specific examples of such alcohols include methanol, ethanol, 1-propanol, 2-propanol, 1-butanol, 1,1-dimethyl ethanol, 2-methyl-1-propanol, 1-pentanol, 2-pentanol, 3-pentanol, 2-methyl-1-butanol, 3-methyl-1-butanol, 2-hexanol, 3-methyl-1-pentanol, 3-methyl-1-pentanol, cyclohexanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, and 1-dodecanol, and the like. Preferably, the alcohols have from 1 to 18 carbon atoms, and more preferably 1 to 12 carbon atoms, with the average number of carbon atoms being about 4 to 18. Some small amount of copolymerizable styrene, vinyl esters, vinyl chloride, vinylidine chloride, acrylonitrile, methacrylonitrile, acryloxypropyl tri-methoxysilane, methacryloxypropyl tri-methoxysilane, other acryloyl monomers and the like may be used. Such monomers are known in the art and many are commercially available. Particularly preferred monomers include isooctyl(meth)acrylate, isononyl (meth)acrylate, 2-ethylhexyl (meth)acrylate, lauryl (meth) acrylate, i-pentyl (meth)acrylate, n-butyl (meth)acrylate, i-butyl (meth)acrylate, methyl (meth)acrylate, ethyl (meth) acrylate, t-butyl(meth)acrylate, tridecyl (meth)acrylate, stearyl (meth)acrylate, and the like and mixtures thereof with above defined monomers.

Representative examples of polar monomers useful as A monomers include hydrophilic unsaturated monomers of a cationic, anionic, nonionic, or amphoteric nature which are polymerizable through radical polymerization. Examples of such polar monomers include acrylic acid, methacrylic acid, itaconic acid, vinyl acetic acid, acrylonitrile, fumaric acid, maleic acid, maleic anhydride, crotonic acid, acrylamide, vinyl pyridine, vinyl pyrrolidone, hydroxyethyl methacrylate, polyethylene glycol mono(meth)acrylate, N,N-dimethylaminoethyl(meth) acrylate, N,N-dimethyldiallyl ammonium chloride or bromide, vinyl sulfonic acid, p-styrene sulfonic acid, N,N-dimethylacrylamide, N-t-butylacrylamide, methacrylonitrile, or salts thereof and the like.

The polymeric additive contains from about 2 to about 60 weight percent of poly(dimethylsiloxane) graft moieties, and preferably from about 5 to about 40 weight percent of the total polymer. The balance of the polymeric additive is the poly(acrylate) polymer as the backbone of the graft polymer.

The polymeric additive can have a molecular weight (number average) ranging from about 1,000 to about 1,000,000, preferably from about 10,000 to about 100,000 and most preferably from about 20,000 to about 30,000.

The polymeric additive can have a polydispersity ranging from about 1 to about 10 and preferably about 2 to 3.

A variety of commercially available poly (dimethylsiloxane)-g-poly(acrylate) polymers are useful as polymeric additives of the present invention. Preferred among these commercially available polymers is a water soluble silicone polymer, 3M brand "Silicones 'Plus' Polymer" poly(dimethylsiloxane)-g-poly(acrylate), Product No. VS 80 commercially available from the Encapsulated Products business of Minnesota Mining and Manufacturing Company of St. Paul, Minn.

Usefulness of the Invention

Use of selected polymeric additives in water-based pigmented ink formulations can reduce the likelihood that the inks will kogate and that the printed images on inkjet media will have mudcracking problems.

Ink formulations of the present invention can be used on any suitable inkjet media known to those skilled in the art.

It has been found in the present invention that there are two major advantages in using water soluble silicone polymers such as poly(dimethylsiloxane)-g-poly(acrylate)s as additives in water-based pigmented inks for ink jet, particularly thermal ink jet printing applications.

Unexpectedly, particularly for pigmented black ink, the incorporation of poly(dimethylsiloxane)-g-poly(acrylate) significantly improves the uniformity of the printed image by significantly reducing the slight but visible banding problems. This indicates that the silicone polymer at least significantly reduces the likelihood that the ink will kogate.

Further unexpectedly, the incorporation of poly (dimethylsiloxane)-g-poly(acrylate) into the ink formulation significantly reduces any mudcracking problem in the image area that is printed with 4-color black image and also significantly reduces banding problem in the image area that is printed with a single color black primary ink formulation.

Further unexpectedly, use of a water and water miscible organic solvent system, particularly those systems with polymer comprising a carboxy functional monomer partially neutralized with a volatile amine (such as ammonia) to enhance water solubility, provides images which are resistant to bleeding after solvent removal and during any re-wetting of the image. Inadvertent or purposeful re-wetting of the image does not mar that image.

The following examples illustrate but do not limit the invention. A 3M brand Silicones "Plus" Polymer VS 80 from 3M Company of St. Paul, Minn. is incorporated in some of the following examples. This polymer has a Mn molecular weight of about 26,000 with a 2.7 polydispersity; an acid equivalent weight of 946 (946 g/mole —COOH); a glass transition temperature around 98° C.

EXAMPLES

Example 1 (Single Color Black)

A pigmented black ink was prepared according to the following procedure:

1. 5.0 grams of a 40% solution of a dispersant was weighed into a 4 oz. (114 ml.) glass jar. The dispersant was made by treating the reaction product of vinyldimethyl azlactone and Bayer's aspartic ester with octyl amine for ring opening followed by hydrolysis using sodium hydroxide solution.

2. 20.0 grams of photographic grade diethylene glycol (obtained from Sigma Chemical Co., St. Louis, Mo.) was added to the dispersant.

3. 68.0 grams of de-ionized water was added to the above mixture.

4. 1.0 gram of 3M brand Silicones "Plus" Polymer VS-80 (10% solution in water) (3M Co., St. Paul, Minn.) was added to the aqueous mixture.

5. The mixture was mixed using gentle shaking until a homogeneous solution was obtained.

6. 3.0 grams of Degussa Special Black 4 (Degussa Corporation, Ridgefield, N.J.) was added to the solution and mixed thoroughly by gentle shaking.

7. 3.0 grams of Triton X-100 (Union Carbide Chemical and Plastics Company Inc, Danbury, Conn.) was added to the mixture.

8. The resulting mixture was again thoroughly mixed by gentle shaking to avoid excess foam formation. At this point, the pH of the resulting mixture was measured and determined to be 9.03.

9. The pigment was dispersed by using a model XL2020 Sonicator made by Misonix Incorporated (Farmingdale, N.Y.) for 3 minutes at a setting of 192 watts.

10. The pH of the dispersion was measured at this point and determined to be 8.05; and the viscosity was measured using a Brookfield viscometer with UL adapter and determined to be 3.54 centipoise.

11. The dispersion was then centrifuged using a Sorvall GLC-2B General Laboratory Centrifuge at 2800 rpm (dial reading) for 1 hour to remove large particles.

The final ink thus prepared was filled into a clean empty HP 51626A DeskJet cartridge and test printed using a NovaJet printer. Continuous printing was carried out to print 34 inches (863.6 mm)×36 inches (914.4 mm) solid blocks onto 3M Scotchprint™ Opaque Ink Jet Film (Product No. 8502) until the cartridge was empty. The ink printed continuously without any problem to produce a uniform black image of excellent quality. No nozzle plugging was observed during the entire printing process, no banding was visible on the printed image, and the appearance of the color density remained the same from the beginning to the end of the solid printed blocks.

Example 2 (Single Color Black)

Another black pigment ink was prepared using the following formulation according the method described below.

|   | Ingredient | Amount (grams) |
|---|---|---|
| 1. | Triton X-100 | 6.0 |
| 2. | Dispersant[1] (50% solution) | 8.0 |
| 3. | 3M VS-80[2] (10% solution) | 2.1 |
| 4. | De-ionized water | 148.0 |
| 5. | Diethylene glycol[3] | 30.0 |
| 6. | Degussa Special Black 4 | 6.0 |

[1]The dispersant was made by treating the reaction product of vinyldimethyl azlactone and Bayer's aspartic ester with octyl amine for ring opening followed by hydrolysis using sodium hydroxide solution according to the disclosure of copending, coassigned U.S. patent application Ser. Nos. 08/556, 336 and 68/558,003, the disclosures of which are incorporated by reference herein.
[2]3M brand Silicones "Plus" Polymer VS-80 (10% solution in water) (3M Co., St. Paul, MN)
[3]Obtained from Sigma Chemical Co., St. Louis, MO.

The above mentioned components were premixed in a 16 oz. (455 ml.) glass jar by gentle shaking. The mixture was dispersed by using a model XL2020 Sonicator made by Misonix Incorporated for 8 minutes at a setting of 165 watts. The resulting dispersion was then centrifuged using a Sorvall GLC-2B General Laboratory Centrifuge at 2800 rpm (dial reading) for 1 hour to remove large particles.

Example 3 (Yellow)—A Comparison Example

A yellow pigment ink was prepared using the following formulation according to the method of Example 2:

|   | Ingredient | Amount (grams) |
|---|---|---|
| 1. | Triton X-100 | 1.0 |
| 2. | Dispersant[1] (50% solution) | 4.0 |
| 3. | 3M VS-80[2] (10% solution) | 1.5 |
| 4. | De-ionized water | 151.4 |
| 5. | Diethylene glycol[3] | 37.0 |
| 6. | Bayer Y-5688 Pigment Yellow 150[4] | 6.0 |

[1]The dispersant was made by treating the reaction product of vinyldimethyl azlactone and Bayer's aspartic ester with octyl amine for ring opening followed by hydrolysis using sodium hydroxide solution according to the disclosure of copending, coassigned U.S. patent application Ser. Nos. 08/556, 336 and 68/558,003, the disclosures of which are incorporated by reference herein.
[2]3M brand Silicones "Plus" Polymer VS-80 (10% solution in water) (3M Co., St. Paul, MN)
[3]Obtained from Sigma Chemical Co., St. Louis, MO.
[4]Bayer Fanchon Fast Yellow Y-5688 C.I. Pigment Yellow 150 (Bayer Corporation, Rock Hill, SC).

The above mentioned components were premixed, dispersed, and centrifuged as described in Example 2 to produce a final yellow ink.

Example 4 (Magenta)

A magenta pigment ink was prepared using the following formulation according to the method of Example 2:

|   | Ingredient | Amount (grams) |
|---|---|---|
| 1 | Triton X-100 | 6.0 |
| 2. | Dispersant[1] (50% solution) | 3.0 |
| 3. | 3M VS-80[2] (10% solution) | 2.0 |
| 4. | De-ionized water | 146.2 |
| 5. | Diethylene glycol[3] | 35.8 |
| 6. | Bayer RV-6828 Pigment Red-122[5] | 7.0 |

[1]The dispersant was made by treating the reaction product of vinyldimethyl azlactone and Bayer's aspartic ester with octyl amine for ring opening followed by hydrolysis using sodium hydroxide solution according to the disclosure of copending, coassigned U.S. patent application Ser. Nos. 08/556, 336 and 68/558,003, the disclosures of which are incorporated by reference herein.
[2]3M brand Silicones "Plus" Polymer VS-80 (10% solution in water) (3M Co., St. Paul, MN)
[3]Obtained from Sigma Chemical Co., St. Louis, MO.
[5]Bayer Quindo Magenta RV-6828 Pigment Red-122 (Bayer Corporation, Rock Hill, SC)

The above mentioned components were premixed, dispersed, and centrifuged as described in Example 2 to produce a final magenta ink.

Example 5 (Cyan)

A cyan pigment ink was prepared using the following formulation according to the method of Example 2:

|   | Ingredient | Amount (grams) |
|---|---|---|
| 1 | Triton X-100 | 6.0 |
| 2 | Dispersant[1] (50% solution) | 4.0 |
| 3 | 3M VS-80[2] (10% solution) | 2.0 |
| 4 | De-ionized water | 146.0 |
| 5 | Diethylene glycol[3] | 36.0 |
| 6 | Bayer B-4810 Pigment Blue-15:3[6] | 6.0 |

[1]The dispersant was made by treating the reaction product of vinyldimethyl azlactone and Bayer's aspartic ester with octyl amine for ring opening followed by hydrolysis using sodium hydroxide solution according to the disclosure of copending, coassigned U.S. patent application Ser. Nos. 08/556, 336 and 68/558,003, the disclosures of which are incorporated by reference herein.
[2]3M brand Silicones "Plus" Polymer VS-80 (10% solution in water) (3M Co., St. Paul, MN)
[3]Obtained from Sigma Chemical Co., St. Louis, MO.
[6]Bayer Palomar Blue B4810 C.I. Pigment Blue-15:3 (Bayer Corporation, Rock Hill, SC)

The above mentioned components were premixed, dispersed, and centrifuged as described in Example 2 to produce a final cyan ink.

Example 6 (Yellow)

A yellow pigment ink was prepared using the following formulation according to the method stated below:

|   | Ingredient | Amount (grams) |
|---|---|---|
| 1. | Dispersant[1] (50% solution) | 1.7 |
| 2. | De-ionized water | 76.4 |
| 3. | Diethylene glycol[3] | 18.9 |
| 4. | Bayer Y-5688 Pigment Yellow 150[4] | 3.0 |

[1]The dispersant was made by treating the reaction product of vinyldimethyl azlactone and Bayer's aspartic ester with octyl amine for ring opening followed by hydrolysis using sodium hydroxide solution according to the disclosure of copending, coassigned U.S. patent application Ser. Nos. 08/556,336 and 68/558,003, the disclosures of which are incorporated by reference herein.
[3]Obtained from Sigma Chemical Co., St. Louis, MO.
[4]Bayer Fanchon Fast Yellow Y-5688 C.I. Pigment Yellow 150 (Bayer Corporation, Rock Hill, SC).

The above mentioned components were premixed in an 8 oz. (228 ml.) glass jar by gentle shaking. The mixture was dispersed by using a model XL2020 Sonicator made by Misonix Incorporated for 4 minutes at a setting of 165 watts. The resulting dispersion was then centrifuged using a Sorvall GLC-2B General Laboratory Centrifuge at 2800 rpm (dial reading) for 1 hour to remove large particles.

Inks from Example 2 to Example 6 were filled into clean, empty HP DeskJet 51626A cartridges. They were then grouped into two separate sets of inks, each set consisting of four colors, and print tested using a test pattern which generated 0.5 inches (12.7 mm) stripes of both primary and secondary colors in the following order: yellow, magenta, cyan, red, green, blue, 4-color black, single color black. Color stripes were printed onto 3M Scotchprint™ Opaque Ink Jet Film (Product No. 8502). These two sets of inks are shown below:

|   |   |
|---|---|
| Ink set number one: | Example 2 (Black) |
|  | Example 3 (Yellow) |
|  | Example 4 (Magenta) |
|  | Example 5 (Cyan) |
| Ink set number two: | Example 2 (Black) |
|  | Example 6 (Yellow) |
|  | Example 4 (Magenta) |
|  | Example 5 (Cyan) |

The appearance of the secondary color stripes generated by these two sets of inks was significantly different. Ink set number one had severe mudcracking problems in all the secondary color stripes: red, green, and 4-color black, all of which use yellow to some extent. Blue also showed some mudcracking. It is presently uncertain why blue also showed mudcracking. Ink set number two showed no mudcracking in blue and 4-color black stripes, but there was still some slight mudcracking in red and green which was only visible when viewed within a short distance. This is an acceptable result for the invention. Comparison Example 3 showed that, for the particular yellow pigment, Fanchon Fast Yellow Y-5688 C.I. Pigment Yellow 150, that the presence of polymeric additive in the ink formulation was not required. However, other yellow pigments may require the presence of the polymeric additive used in the present invention.

Example 7 (Single Color Black)

A black pigment ink was prepared using the following formulation according to the method described below:

|   | Ingredient | Amount (grams) |
|---|---|---|
| 1. | Triton X-100 | 3.0 |
| 2. | Amphoterge KJ 2[7] | 2.0 |
| 3. | 3M VS-80[2] (10% solution) | 1.0 |
| 4. | De-ionized water | 73.0 |
| 5. | Ethylene glycol[8] | 18.0 |
| 6. | Degussa Special Black 4 | 3.0 |

[7]Obtained from Lonza Inc., Fair Lawn, NJ
[2]3M brand Silicones "Plus" Polymer VS-80 (10% solution in water) (3M Co., St. Paul, MN)
[8]Obtained from Fisher Scientific Company, Fair Lawn, NJ.

The above mentioned components were premixed in an 8 oz. (227 ml.) glass jar by gentle shaking. The mixture was dispersed by using a model XL2020 Sonicator made by Misonix Incorporated for 4 minutes at a setting of 165 watts. The resulting dispersion was then centrifuged using a Sorvall GLC-2B General Laboratory Centrifuge at 2800 rpm (dial reading) for 1 hour to remove large particles.

Example 8 (Magenta)

A magenta pigment ink was prepared using the following formulation according to the method of Example 7:

|   | Ingredient | Amount (grams) |
|---|---|---|
| 1. | Triton X-100 | 3.0 |
| 2. | Amphoterge KJ 2[7] | 2.0 |
| 3. | 3M VS-80[2] (10% solution) | 1.0 |
| 4. | De-ionized water | 72.6 |
| 5. | Ethylene glycol[8] | 17.9 |
| 6. | Bayer RV-6828 Pigment Red-122[5] | 3.5 |

[7]Obtained from Lonza Inc., Fair Lawn, NJ
[2]3M brand Silicones "Plus" Polymer VS-80 (10% solution in water) (3M Co., St. Paul, MN)
[8]Obtained from Fisher Scientific Company, Fair Lawn, NJ.
[5]Bayer Quindo Magenta RV-6828 Pigment Red-122 (Bayer Corporation, Rock Hill, SC)

The above mentioned components were premixed, dispersed, and centrifuged as described in Example 7 to produce a final magenta ink.

Example 9 (Cyan)

A cyan pigment ink was prepared using the following formulation according to the method of Example 7:

|   | Ingredient | Amount (grams) |
|---|---|---|
| 1. | Triton X-100 | 3.0 |
| 2. | Amphoterge KJ 2[7] | 2.0 |
| 3. | 3M VS-80[2] (10% solution) | 1.0 |
| 4. | De-ionized water | 73.0 |
| 5. | Ethylene glycol[8] | 18.0 |
| 6. | Bayer B-4810 Pigment Blue-15:3[6] | 3.0 |

[7]Obtained from Lonza Inc., Fair Lawn, NJ
[2]3M brand Silicones "Plus" Polymer VS-80 (10% solution in water) (3M Co., St. Paul, MN)
[8]Obtained from Fisher Scientific Company, Fair Lawn, NJ.
[6]Bayer Palomar Blue B4810 C.I. Pigment Blue-15:3 (Bayer Corporation, Rock Hill, SC)

The above mentioned components were premixed, dispersed, and centrifuged as described in Example 7 to produce a final cyan ink.

Example 10 (Single Color Black), A Comparison Example

A black pigment ink was prepared using the following formulation according to the method of Example 7:

|    | Ingredient           | Amount (grams) |
|----|----------------------|----------------|
| 1. | Triton X-100         | 3.0            |
| 2. | Amphoterge KJ 2[7]   | 2.0            |
| 3. | De-ionized water     | 74.0           |
| 4. | Ethylene glycol[8]   | 18.0           |
| 5. | Degussa Special Black 4 | 3.0         |

[7]Obtained from Lonza Inc., Fair Lawn, NJ
[8]Obtained from Fisher Scientific Company, Fair Lawn, NJ.

The above mentioned components were premixed, dispersed, and centrifuged as described in Example 7 to produce a final black ink

Example 11 (Yellow), A Comparison Example

A yellow pigment ink was prepared using the following formulation according to the method of Example 7:

|    | Ingredient                      | Amount (grams) |
|----|---------------------------------|----------------|
| 1. | Amphoterge KJ 2[7]              | 2.0            |
| 3. | De-ionized water                | 76.4           |
| 4. | Ethylene glycol[8]              | 18.6           |
| 5. | Bayer Y-5688 Pigment Yellow 150[4] | 3.25        |

[7]Obtained from Lonza Inc., Fair Lawn, NJ
[8]Obtained from Fisher Scientific Company, Fair Lawn, NJ.
[4]Bayer Fanchon Fast Yellow Y-5688 C.I. Pigment Yellow 150 (Bayer Corporation, Rock Hill, SC).

The above mentioned components were premixed, dispersed, and centrifuged as described in Example 7 to produce a final yellow ink

Example 12 (Magenta), A Comparison Example

A magenta pigment ink was prepared using the following formulation according to the method of Example 7:

|    | Ingredient                     | Amount (grams) |
|----|--------------------------------|----------------|
| 1. | Triton X-100                   | 3.0            |
| 2. | Amphoterge KJ 2[7]             | 2.0            |
| 3. | De-ionized water               | 73.6           |
| 5. | Ethylene glycol[8]             | 17.9           |
| 6. | Bayer RV-6828 Pigment Red-122[5] | 3.5          |

[7]Obtained from Lonza Inc., Fair Lawn, NJ
[8]Obtained from Fisher Scientific Company, Fair Lawn, NJ.
[5]Bayer Quindo Magenta RV-6828 Pigment Red-122 (Bayer Corporation, Rock Hill, SC)

The above mentioned components were premixed, dispersed, and centrifuged as described in Example 7 to produce a final magenta ink.

Example 13 (Cyan) A Comparison Example

A cyan pigment ink was prepared using the following formulation according to the method of Example 7:

|    | Ingredient         | Amount (grams) |
|----|--------------------|----------------|
| 1. | Triton X-100       | 3.0            |
| 2. | Amphoterge KJ 2[7] | 2.0            |
| 3. | De-ionized water   | 74.0           |

-continued

|    | Ingredient                     | Amount (grams) |
|----|--------------------------------|----------------|
| 5. | Ethylene glycol[8]             | 18.0           |
| 6. | Bayer B-4810 Pigment Blue-15:3[6] | 3.0         |

[7]Obtained from Lonza Inc., Fair Lawn, NJ
[8]Obtained from Fisher Scientific Company, Fair Lawn, NJ.
[6]Bayer Palomar Blue B4810 C.I. Pigment Blue-15:3 (Bayer Corporation, Rock Hill, SC)

The above mentioned components were premixed, dispersed, and centrifuged as described in Example 7 to produce a final cyan ink.

Inks from Example 7 to Example 13 were filled into clean empty HP DeskJet 51626A cartridges. They were then grouped into two separate sets of inks, each set consisting of four colors, and print tested using a test pattern which generated 0.5 inches (12.7 mm) stripes of both primary and secondary colors in the following order: yellow, magenta, cyan, red, green, blue, 4-color black, black. Color stripes were printed onto 3M Scotchprint™ Opaque Ink Jet Film (Product No. 8502). These two sets of inks are shown below:

| Ink set number three: | Example 7 (Black) |
|                       | Example 6 (Yellow) |
|                       | Example 8 (Magenta) |
|                       | Example 9 (Cyan) |
| Ink set number four: Comparison Examples | Example 10 (Black) |
|                       | Example 11 (Yellow) |
|                       | Example 12 (Magenta) |
|                       | Example 13 (Cyan) |

Test results showed a significant difference in the appearance of the 4-color black stripes generated by these two sets of inks. Ink set number three, including polymeric additives of the present invention in black, magenta, and cyan, printed a uniform 4-color black stripe free of any mudcracking, whereas ink set number four having no polymeric additives of the present invention in any of the four colors showed pronounced mudcracking in the 4-color black stripe. Both blue stripes (a secondary color based on a mixture of cyan and magenta) printed with the two sets of inks were free of mudcracking; however, the green stripes and the red stripes (secondary colors based on a mixture including yellow) of both sets showed some mudcracking which was visible when viewed at a short distance. Mudcracking seen only at a short distance is an acceptable result.

From the examples, one skilled in the art will recognize that polymeric additive of the present invention is a benefit for cyan-, magenta-, and black-pigmented inks and can be a benefit for yellow-pigmented inks depending on the particular yellow pigment employed. The cumulative benefit of the polymeric additive used in the present invention can be best seen in those secondary colors requiring a mixture of any two of cyan-, magenta-, or black-pigmented inks. One cannot supply all of the polymeric additive used in the present invention through only one or two of the pigments to minimize mudcracking in secondary colors because too much of the polymeric additive will effectively clog the inkjet delivery systems through which the ink formulations pass because the ink viscosity will be too high to allow efficient ink drop formation during the printing process.

Moreover, use of the polymeric additive in the present invention minimizes banding, particularly in tests involving single color black primary color. Use of the polymeric additive in ink formulations of the present invention minimizes a progressive lowering of the projected drop volumes which could otherwise result in either banding or an undesired decrease in reflective optical density. Also use of polymeric additive in ink formulations of the present invention can minimize a progressive decrease in drop velocity of inkjet inks, which could otherwise result in an undesired misdirection of ink drops toward the media.

The invention is not limited to the embodiments described above. The claims follow.

What is claimed is:

1. A water-based pigmented ink formulation comprising: a water soluble or water dispersible vinyl silicone polymer, pigment, dispersant, surfactant, and a water-based carrier liquid, wherein the vinyl silicone polymer is a graft copolymer having a silicone polymer backbone and vinyl polymer grafts, wherein the vinyl silicone polymer has the following formula:

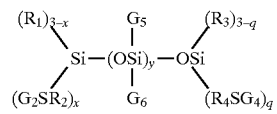

wherein $G_5$ represent monovalent moieties which can independently be the same or different selected from the group consisting of alkyl, aryl, alkaryl, alkoxy, alkylamino, fluoroalkyl, hydrogen, and -ZSA; A represents a vinyl polymeric segment consisting essentially of polymerized free radically polymerizable monomer, and Z is a divalent linking group;

$G_6$ represents monovalent moieties which can independently be the same or different selected from the group consisting of alkyl, aryl, alkaryl, alkoxy, alkylamino, fluoroalkyl, hydrogen, and -ZSA;

$G_2$ comprises A;

$G_4$ comprises A;

$R_1$ represents monovalent moieties which can independently be the same or different and are selected from the group consisting of alkyl, aryl, alkaryl, alkoxy, alkylamino, fluoroalkyl, hydrogen, and hydroxyl;

$R_2$ can independently be the same or different and represents divalent linking groups;

$R_3$ represents monovalent moieties which can independently be the same or different and are selected from the group consisting of alkyl, aryl, alkaryl, alkoxy, alkylamino, fluoroalkyl, hydrogen, and hydroxyl;

$R_4$ can independently be the same or different and are divalent linking groups;

x is an integer of 0–3;

y is an integer of 5 or greater;

q is an integer of 0–3;

wherein at least one of the following is true:
q is an integer of at least 1;
x is an integer of at least 1;
$G_5$ comprises at least one -ZSA moiety;
$G_6$ comprises at least one -ZSA moiety.

2. The formulation of claim 1, wherein the vinyl silicone polymer comprises poly(dimethylsiloxane)-g-poly(acrylate) polymer.

3. The formulation of claim 1, wherein the vinyl silicone polymer comprises from about 0.01 to about 8 percent by weight of the total ink formulation.

4. The formulation of claim 1, wherein the vinyl silicone polymer comprises from about 0.02 to about 4 percent by weight of the total ink formulation.

5. An ink, comprising: pigment, dispersant, surfactant, a water-based carrier liquid, and silicone-containing polymeric additive, wherein the additive is a vinyl silicone polymer having the following formula:

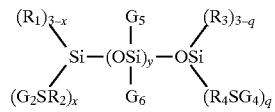

wherein $G_5$ represent monovalent moieties which can independently be the same or different selected from the group consisting of alkyl, aryl, alkaryl, alkoxy, alkylamino, fluoroalkyl, hydrogen, and -ZSA; A represents a vinyl polymeric segment consisting essentially of polymerized free radically polymerizable monomer, and Z is a divalent linking group;

$G_6$ represents monovalent moieties which can independently be the same or different selected from the group consisting of alkyl, aryl, alkaryl, alkoxy, alkylamino, fluoroalkyl, hydrogen, and -ZSA;

$G_2$ comprises A;

$G_4$ comprises A;

$R_1$ represents monovalent moieties which can independently be the same or different and are selected from the group consisting of alkyl, aryl, alkaryl, alkoxy, alkylamino, fluoroalkyl, hydrogen, and hydroxyl;

$R_2$ can independently be the same or different and represents divalent linking groups;

$R_3$ represents monovalent moieties which can independently be the same or different and are selected from the group consisting of alkyl, aryl, alkaryl, alkoxy, alkylamino, fluoroalkyl, hydrogen, and hydroxyl;

$R_4$ can independently be the same or different and are divalent linking groups;

x is an integer of 0–3;

y is an integer of 5 or greater;

q is an integer of 0–3;

wherein at least one of the following is true:
q is an integer of at least 1;
x is an integer of at least 1;
$G_5$ comprises at least one -ZSA moiety;
$G_6$ comprises at least one -ZSA moiety.

6. The ink of claim 5, wherein the vinyl silicone polymer comprises poly(dimethylsiloxane)-g-poly(acrylate) polymer.

7. The ink of claim 6, wherein the vinyl silicone polymer comprises from about 0.01 to about 8 percent by weight of the total ink formulation.

8. The ink of claim 7, wherein the amount of pigment in the ink formulation ranges from about 0.1 to about 15 percent, wherein the amount of dispersant in the ink formulation ranges from about 0.1 to about 20 percent, wherein the amount of surfactant in the ink formulation ranges from about 0.01 to about 6 percent, and wherein the amount of water in the ink formulation ranges from about 20 to about 90 percent of the total ink composition.

9. The ink of claim 8, further comprising a polyhydric alcohol, wherein the amount of polyhydric alcohol in the ink formulation ranges from about 5 to about 70 percent by weight of the total ink composition.

10. The ink of claim 11, wherein the water-based carrier liquid is water.

11. The ink of claim 11, wherein the water-based carrier liquid is water and a water-miscible organic solvent.

12. The ink of claim 11, wherein the water-miscible organic solvent comprises a volatile amine.

13. The ink of claim 12, wherein the volatile amine is ammonia.

14. A method of using an ink of claim 11, comprising the step of delivering the ink from a cartridge to inkjet media.

* * * * *